United States Patent [19]

Park

[11] Patent Number: 5,323,187

[45] Date of Patent: Jun. 21, 1994

[54] IMAGE COMPRESSION SYSTEM BY SETTING FIXED BIT RATES

[75] Inventor: Ku-man Park, Seoul, Rep. of Korea

[73] Assignee: Samsung Electronics Co., Ltd., Kyungki, Rep. of Korea

[21] Appl. No.: 956,352

[22] Filed: Oct. 5, 1992

[30] Foreign Application Priority Data

Dec. 20, 1991 [KR] Rep. of Korea .................. 91-23727

[51] Int. Cl.$^5$ .......................................... H04N 7/130
[52] U.S. Cl. ........................................... 348/405
[58] Field of Search ................... 358/13, 133, 136; H04N 7/130

[56] References Cited

U.S. PATENT DOCUMENTS

| | | | |
|---|---|---|---|
| 4,734,767 | 3/1988 | Kaneko et al. ............. | 358/133 |
| 4,752,827 | 6/1988 | Cassagne et al. .......... | 358/133 |
| 4,757,383 | 7/1988 | Tanaka ...................... | 358/133 |
| 4,931,869 | 6/1990 | Amor et al. ................ | 358/133 |
| 5,038,209 | 8/1991 | Hang .......................... | 358/136 |
| 5,063,608 | 11/1991 | Siegel ........................ | 358/133 |
| 5,109,451 | 4/1992 | Aono et al. ................. | 358/133 |
| 5,216,712 | 6/1993 | Shimoda et al. ........... | 358/133 |

Primary Examiner—Tommy P. Chin
Assistant Examiner—Richard Lee
Attorney, Agent, or Firm—Sughrue, Mion, Zinn, Macpeak & Seas

[57] ABSTRACT

An image compression system using the setting of fixed bit rates for compressing an image wherein image blocks are sorted into classes in accordance with the activities of the blocks, the activities being obtained by dividing an original image by a predetermined unit. Individual scale factors are given for each block, so that coding is carried out by fixing the allocating amount of bits to blocks to be coded. The system is operated by a method which detects activities according to a visual characteristic for each predetermined block unit, classifies blocks into corresponding classes based on the detected activities, sets a quantization scale factor corresponding to a sorted class by the average activity of the activities, controls the quantization by determining a quantization stepsize according to a predetermined value of a quantization table and a quantization scale factor, determines the pertinence of bit number of the quantized coefficient with respect to an allocated bit number per block, and repeatedly adjusts the block bit number to be output to carry out entropy coding. Thus, the quality of an image can be stabilized.

11 Claims, 2 Drawing Sheets

IMAGE COMPRESSION SYSTEM BY SETTING FIXED BIT RATES

BACKGROUND OF THE INVENTION

The present invention relates to a compression system of a motion image or a still image, and particularly to an image compression system for compressing an image by fixing the amount of compressed bits with respect to a block of a predetermined size (for instance, 8×8 or 16×16).

Along with the development of computer and digital communication technology, digitization of image information is becoming increasingly necessary for the storage and transmission thereof. However, the digitizing of image information is disadvantageous in that a massive amount of data is generated. Image information compression techniques are developed to help counteract this disadvantage.

Compression coding of an original image can be classified into motion image coding and still image coding, according to which form of construction is implemented. Motion image coding compresses data by eliminating the redundancy of temporally successive images in the interframe pictures. Meanwhile, still image coding compresses data by eliminating the redundancy in the intraframe. Therefore, since real-time information processing is made in motion image coding, here, the method used for information transmission has a very high speed as well as transmission effectiveness, but image quality is degraded. On the other hand, still image coding has the advantage of providing high quality images although it is difficult to process the information in real time. Due to these factors, these two coding techniques have been developed to supplement each other while maintaining the advantages of each.

The Joint Photographic Experts Group (JPEG) has provisionally decided on a standardized coding system in which a discrete cosine transformation (DCT) coding system is adopted. Here, DCT coding system is the transformation system wherein data is subjected to a two-dimensional DCT, so that a statistical characteristic with respect to the obtained transformation coefficient is obtained, and a quantization method suitable for the statistical characteristic is applied, thereby compressing data. The DCT coding system has almost the same performance as Karhunen-Loeve Transformation, which is the optimum transformation technique with respect to a first order Markov signal source, and thus is frequently utilized for compressing data, filtering, and extracting characteristics.

Since the late 1970's, the endeavor to carry out coding using the statistical characteristics of the DCT coefficients has been made and resulted in the development of the following technique.

That is, an effective coding system using discrete cosine transformation, presented by W. H. Chen and C. H. Smith, is carried out such that an AC energy is segmented into four classes according to activity levels. Here, fewer bits are allocated to a class with less activity, while more bits are allocated to a class with relatively great activity (pp. 1285-1292 of IEEE Trans. Comm., Vol. COM-25 published in 1977 entitled "Adaptive Coding of Monochrome and Color Images"). However, since all classes are segmented to have an equal number of blocks regardless of the simplicity or complexity of an image, this system has problems in that the inherent activity of a block is not considered, and bits are allocated by the relative complexity of the overall image.

In addition, W. H. Chen and W. K. Pratt have suggested a system wherein a scale factor is repeatedly adjusted to maintain a constant amount of coded bits using a rate buffer, thereby enabling an NTSC color image to be transmitted at 1.5 Mbps (pp. 225-232 of IEEE Trans. Comm., Vol. COM-32 published in 1984 entitled "Scene-Adaptive Coder"). The construction of this system is relatively simple. However, since the amount of bits is adjusted while repeatedly changing the scale factor, the characteristic of the block does not correspond to the scale factor in this system. A further problem is that the excessive bits of a current block are transferred to another block. Also, the amount of bits is not previously estimated.

K. N. Ngan, K. S. Leong, and H. Singh have proposed a system which is similar to that of the above Chen and Pratt system in construction, and adopts the human visual system (suggested by Nill on pages 551-557 of IEEE Trans. Comm., Vol. COM-33 published in 1985, entitled "A Visual Model Weighted Cosine Transform for Image Compression and Quality Assessment") to transformation coefficients. In this system, since the scale factors are repeatedly varied in accordance with the distortion between each block and the state of the rate buffer, it has the problem of the block characteristics not corresponding to the scale factors.

In the above-described systems, since the amount of bits is stabilized by varying scale factors according to the coded state of each block, bits are not properly allocated when the scale factors greatly fluctuate. Moreover, a problem in the current block is transferred to the next block, so that the distortion in one block affects a neighboring block, which causes the original image to be impaired unevenly.

SUMMARY OF THE INVENTION

It is an object of the present invention to provide an image compression system by setting fixed bit rates for compressing an image, wherein classes are sorted in accordance with the activities of blocks obtained by dividing an original image by a predetermined size, and individual scale factors are given to each block, so that coding is carried out by fixing the allocating amount of bits to blocks to be coded.

It is another object of the present invention to provide an image compression system by setting fixed bit rates, wherein the last non-zero coefficient is set by repeatedly adjusting an amount of bits in a block obtained by dividing an original image by a predetermined size, in accordance with a predetermined allocation amount of bits per block.

To achieve these and other objects of the present invention, there is provided an image compression method by setting fixed bit rates in an image compression system which performs transformation coding of an original image into a predetermined block size, quantizes and entropy-codes the coded image, and stores or transmits a coded number of bits, the method comprising the steps of:

activity detecting for detecting activities in accordance with the visual characteristics per block;

class sorting for classifying blocks into corresponding classes in accordance with the activities detected in the activity detecting step;

quantization controlling for setting quantization scale factors corresponding to the classes by the average activity of the activities, and controlling the quantization by determining a quantization stepsize in accordance with predetermined values of a quantization table and the quantization scale factors; and bit number adjusting for determining whether or not the bit number of the quantized coefficients in the quantization controlling step is suitable for an allocated number of bits per block set in accordance with the activities detected in the activity detecting step, and repeatedly adjusting the block bit number until it is suitable for the allocated number of bits per block, thereby performing entropy coding.

BRIEF DESCRIPTION OF THE DRAWINGS

The objects and features of the present invention will become more readily apparent from the following detailed description of the preferred embodiment taken in conjunction with the accompanying drawings, in which.

DETAILED DESCRIPTION OF THE INVENTION

A system suggested in the present invention obtains the activities of an image on the basis of the baseline system of the JPEG algorithm provisionally determined as the standard by the ISO and CCITT, which are international organizations for standardization. Then, according to the relative activity of a block, the DCT coding is performed and the amount of bits is fixed in consideration of visual characteristics.

Figure 1:
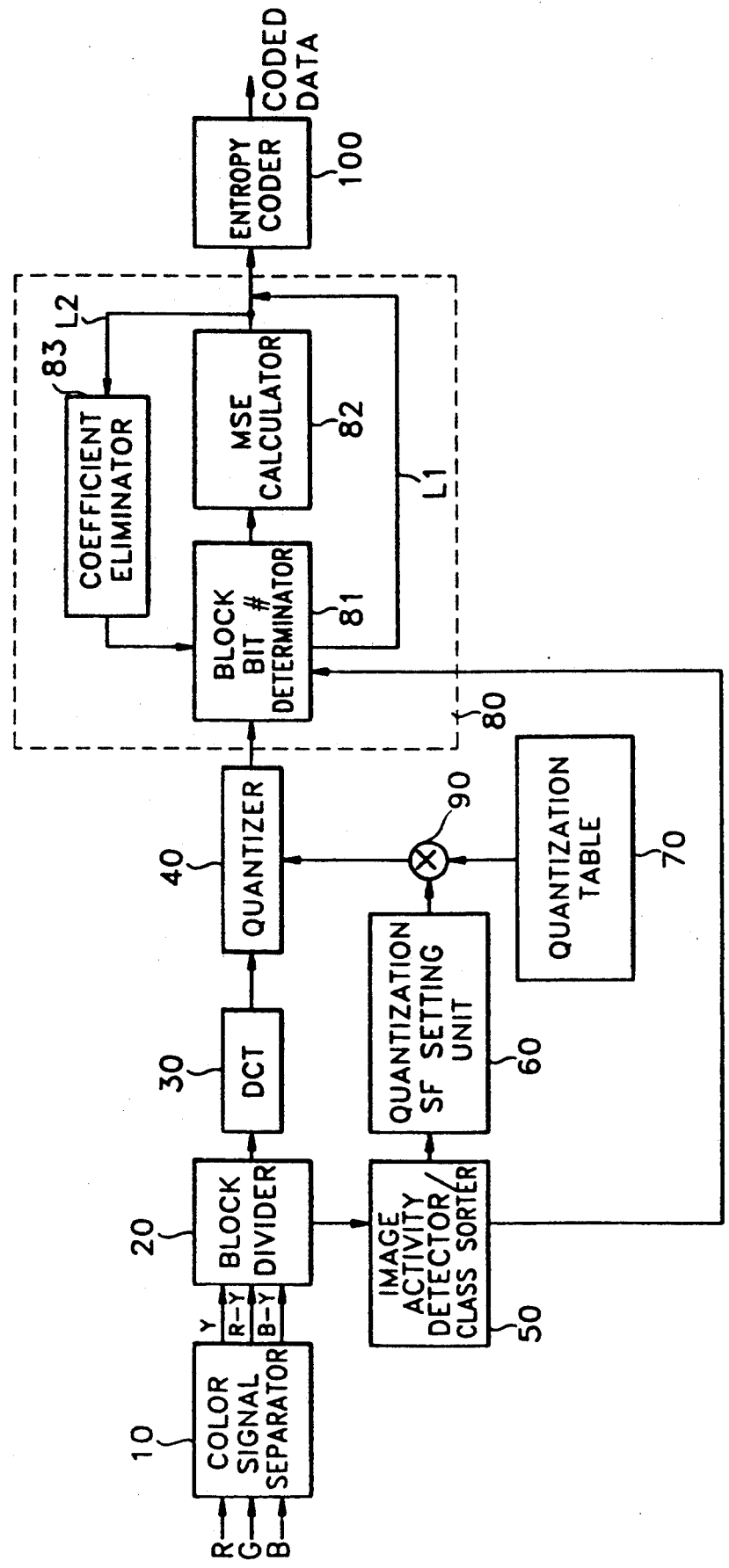
FIG. 1 is a block diagram showing a circuit for carrying out an image compression method according to the present invention.

FIG. 1 is a block diagram of a circuit for accomplishing the image compression method according to the present invention. Here, the circuit includes: a color signal separator 10 which separates the R, G, and B color signals of an original image into a luma signal Y and color difference signals R-Y and B-Y and provides them as outputs; a block divider 20 which divides blocks into a predetermined unit with respect to the three component signals of an image from color signal separator 10; a discrete cosine transformer (DCT) 30 hose input is connected to the output of the block divider 20; an image activity detector/class sorter 50 which detects the activities with respect to the three component signals and classifies the blocks into corresponding classes in accordance with the detected activities by connecting its input to the output of the block divider 20; a quantization scale factor (SF) setting unit 60 which defines a quantization scale factor corresponding to a class set in the image activity detector/class sorter 50; a quantization table 70; a multiplier 90 which multiplies the signals from the SF setting unit 60 and the quantization table 70; a quantizer 40 which quantizes the transformation coefficients from the DCT 30 by quantization stepsizes supplied from the multiplier 70; a bit number controller 80 which controls the number of bits in blocks having passed through quantizer 40 by the allocated number of bits supplied from the image activity detector/class sorter 50 as a reference; and an entropy coder 100 for entropy-coding the output signals from the bit number controller 80 and outputting the entropy-coded signals.

In further detail, bit number controller 80 is composed of: a block bit number determinator 81 which calculates the number of bits from the quantizer 40, and determines the pertinence of the calculated quantization number of bits by comparison with the above-stated allocated number of bits (when the number of calculated quantization bits is compared with the number of allocated bits, and the former is not more than the latter, the quantization coefficients are defined in terms of their pertinence); a mean square error (MSE) calculator 82 connected between the block bit number determinator 81 and the entropy coder 100, which calculates the mean square error of a currently input number of bits when the supplied number of bits is larger than the allocated number of bits; and a coefficient eliminator 83 whose input is connected to the MSE calculator 82 and whose output is connected to the input of the block bit number determinator 81.

Figure 2:
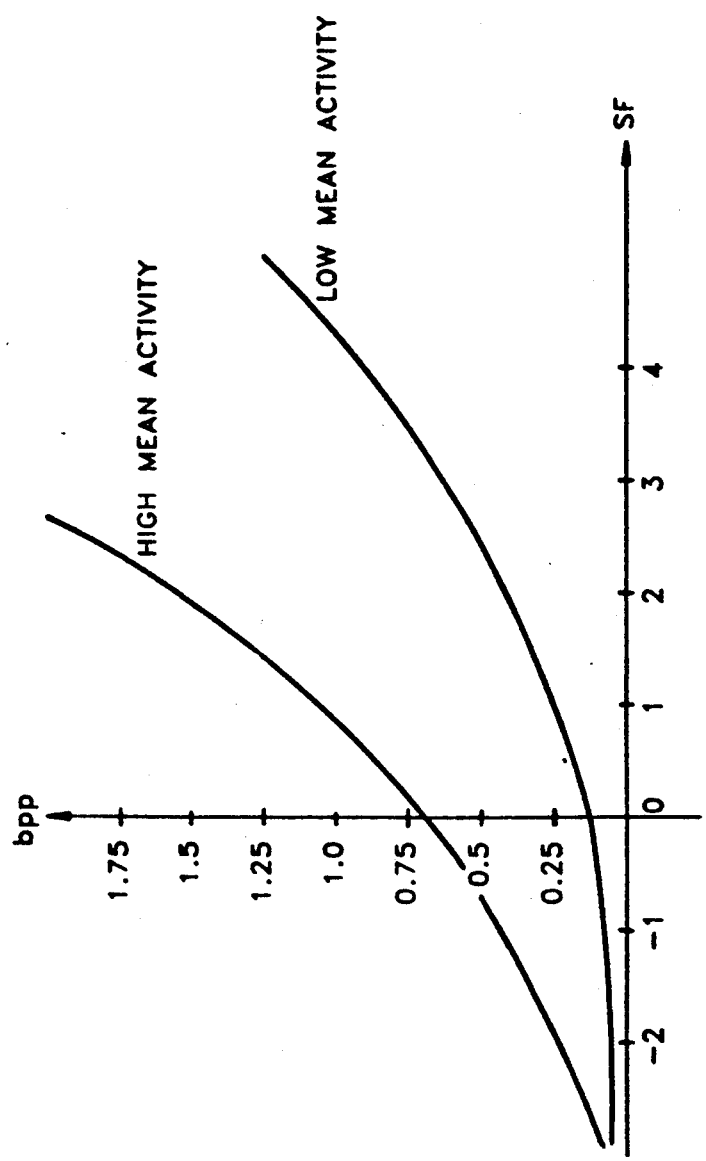
FIG. 2 shows bit per pixel and scale factors with respect to the average activities of an image.

FIG. 2 shows characteristic curves representing bits per pixel (bpp) and the scale factor (SF) according to average activities detected in the image activity detector/class sorter 50 shown in FIG. 1.

The operation of the image compression circuit shown in FIG. 1 is as follows.

To being with, the operations of the color signal separator 10, the quantizer 40 using the quantization table 70 and the SF setting unit 60, the DCT 30 and the entropy coder 90 are the same as those described in U.S. patent application Ser. No. 07/915,501 filed on Jul. 20, 1992 by Jong-kuk Kim et al., Samsung Electronics Co., which will be briefly described.

The color signal separator 10 performs color coordinates-transformation of the R, G, and B signals of the original image signal into three component signals which are a luma signal Y and color difference signals R-Y and B-Y. Then, the amount of data is decreased by sub-sampling them with a ratio of 2:1 in the vertical direction of respective color difference signals R-Y and B-Y. For example, when the image size of the luma signal Y obtained by color coordinate-transformation is 720 H×480 V, those of color difference signals R-Y and B-Y are each sub-sampled to 360 H×240 V. Also, aliasing of the color difference signal is prevented by low-pass-filtering the image before sub-sampling the signals. When the color difference signals R-Y and B-Y compressed as described above are reconstructed, values between pixels are interpolated, thereby filling in all of the original image.

The block divider 20 segments blocks with respect to the three component signals Y, R-Y and B-Y at predetermined units. In more detail, if the luma and color difference signals are each segmented into a block of 8×8 pixels in the block divider 20, the luma signal Y is segmented into 90×60 blocks, and R-Y and B-Y are each divided into 45×30 blocks, so that the total number of divided blocks is 8,100.

The image activity detector/class sorter 50 calculates the activity of an image which is an indication of the complexity and orientation of the blocks segmented with respect to the supplied luma signal Y and the color difference signals R-Y and B-Y each with a predetermined unit, e.g., 8×8 pixels. In other words, four directional activities are calculated with respect to the obtained blocks. The activities of each direction are as below:

$$\Delta H(m) = \frac{1}{N(N-1)} \sum_{i=0}^{N-1} \sum_{j=0}^{N-2} |f(i,j) - f(i,j+1)| \quad (1)$$

$$\Delta V(m) = \frac{1}{N(N-1)} \sum_{i=0}^{N-2} \sum_{j=0}^{N-1} |f(i,j) - f(i+1,j)| \quad (2)$$

$$\Delta 135(m) = \frac{1}{(N-1)(N-1)} \sum_{i=0}^{N-2} \sum_{j=0}^{N-2} |f(i,j) - f(i+1,j+1)| \quad (3)$$

$$\Delta 45(m) = \frac{1}{(N-1)(N-1)} \sum_{i=0}^{N-2} \sum_{j=0}^{N-2} |f(i,j) - f(i+1,j-1)| \quad (4)$$

where "m" designates the position of one block; "N" is indicative of block size (8 in the case of a block of 8×8); $\Delta H$ is the activity in the vertical direction; $\Delta V$ is the activity in the horizontal direction; and $\Delta 135$ and $\Delta 45$ are activities in the directions at 135° and 45°, respectively; "i" indicates the vertical direction; "j" indicates the horizontal direction; and "f" is the value of a pixel, wherein f(i,j) is the value of a pixel in a spatial domain prior to being changed.

The activity of a block can be obtained by these four orientation activities. That is, the activities are expressed by a square root obtained after squaring four orientation activities and then summing them, so that the activity A(m) in the mth block is written as:

$$A(m) = \sqrt{(\Delta H)^2 + (\Delta V)^2 + (\Delta 135)^2 + (\Delta 45)^2} \quad (5)$$

Since the activity is in proportion to the number of bits, the greater the activity is, the more the bit amount is, so that an allocated number of bits of a block is defined in accordance with the activity value. That is, the number of allocated bits can be calculated from the sum of the activities and the total number of bits available according to the relative activity ratio of a predetermined block, which serves as a reference unit. Here, the calculated allocated number of bits is output to the block bit number calculator 81 of the bit number controller 80. Also, an average activity is obtained by dividing the sum of the activities by the total number of the blocks, thereby affecting the scale factor setting. The following classes are sorted using the principal orientation and the variance of each block. In other words, classes are categorized by checking the degree of disorder and the orientation of each block via equations (1) through (4). The variance (VAR) is expressed as below:

$$VAR = \frac{1}{N^2} \sum_{i=0}^{N-1} \sum_{j=0}^{N-1} |f(i,j) - \bar{f}|^2 \quad (6)$$

where $\bar{f}$ is the mean value of the block pixels.

Respective classes are defined according to the following standard. Four orientation activities are obtained for every one block as the equations (1) through (4). Then, the blocks are arranged in order from the smaller activity values to the larger activity values. At this time, a smaller activity value means that the orientational component is strong in that direction. In an order starting from the smallest value, the four orientational activity values correspond to MIN1, MIN2, MIN3, and MIN4. Then, in accordance with their activity value, MINi value, and variance, the blocks are classified into seven classes described as follows.

(1) Class 0:
i) condition: A(m)>50 and VAR>700,
ii) meaning: a block has great activity and is disordered.
(2) Class 6:
i) condition: VAR<450 and MIN1<11.0.
ii) meaning: a block of a low frequency component, which rarely has activity and orientation.
(3) Class 2, Class 3, Class 4, and Class 5:
i) condition: MIN1<11.0 and MIN1/MIN2<0.65 or MIN1<11.0 and MIN1/MIN3<0.50.
ii) meaning: the direction of activity indicated by MIN1 is the principal orientation of a block.
(4) Class 1:
i) condition: all remaining situations except the foregoing situations,
ii) meaning: a block has a degree of activity, but it is difficult to fix a specific principal orientation.

As described above, the SF setting unit 60 determines scale factors and the attenuation rates $2^{-SF}$ which are the quantization parameters by the average activity obtained in the image activity detector/class sorter 50. The average activity is represented by the characteristic curve shown in FIG. 2 which is obtained through various experiments on images ranging from simple to complicated. Thus, by the characteristic curves shown in FIG. 2, an approximate scale factor (SF) can be obtained with respect to the desired bits per pixel (bpp) per image.

The DCT 30 sequentially performs discrete cosine transformation by ordering from the leftmost top to the rightmost bottom of the image which is segmented in the block divider 20.

The quantization stepsize is controlled in the quantizer 40 by the output of the multiplier 90 produced by the quantization matrix, the SF defined per class, and the decreasing rate lessened by the defined SF. That is, as described in the above patent application Ser. No. 07/915,501, since each coefficient has a different visual importance according to its position, matrix elements (quantization stepsize) composed of variable values are applied in accordance with each position. When the quantization matrix is indicated by QM(U,V), and the quantization stepsize with respect to each DCT coefficient is indicated by Q(U,V), the Q(U,V) is represented as the following equation.

$$Q(U,V) = 2^{-SF} \times QM(U,V) \quad (7)$$

Accordingly, the DCT coefficients are variably subjected to being linearly quantized according to the quantization matrix. Each element of the quantization matrix is the stepsize of the linear quantizer. In more detail, the elimination rate of the coefficients not included in the principal orientation component of each block is raised, thereby controlling each stepsize to be different per coefficient.

The methods suitable for eliminating coefficients per class are stated below.

Class 1: Since these blocks have a degree of complexity but do not have particular characteristics, they are quantized using preset SF.

Class 0: Since it has complicated and disordered characteristics, the coefficient closer to a high frequency position within the block is eliminated by heightening the decreasing rate. That is to say, data is eliminated using the fact that the distortion can barely be perceived by the naked eye when the data is more complicated and has more high frequency components.

Class 2 to Class 5: Since the blocks have an orientational property, the components among the DCT coefficients other than the principal orientational component are properly attenuated.

Class 6: It is the gathering of the repetitious blocks and those containing minimal changes, wherein, although the principal components are rare in the low frequency domain, if the coefficients are excessively eliminated, a block effect occurs. Therefore, Weber's theory is used to decrease the amount of data while eliminating the block effect. For example, the erasing rate of the DCT coefficient is raised in a block whose mean value is a luma signal Y which is less than approximately 80, or more than approximately 170.

When the coefficient decreasing operation is finished, quantization is carried out in accordance with the above-described quantization stepsize, and then the results are output.

The quantization table 70 employs a similar quantization matrix to the one suggested by the ISO and CCITT.

The bit amount controller 80 is provided for giving an allocated number of bits in advance according to the activity of a block, and for accurately controlling the amount of bits per block by comparing the allocated number of bits with the quantization coefficients, wherein a repeated coefficient eliminating method is utilized. First, the allocated number of bits per block is supplied from the image activity detector/class sorter 50, and an initial total-bit number in a block is calculated.

The initial total-bit number is obtained by summing entire activities A(m) of all blocks, and is expressed in the following equation.

$$TA(0) = \sum_{m=0}^{k-1} A(m) \qquad (8)$$

where "k" is the total number of blocks in an image.

The initial total-bit amount TB(0) in accordance with the desired bit rate is written as:

$$TB(0) = N \qquad (9)$$

where "N" is the total amount of required bits in an image.

According to the foregoing equation, the allocated number of bits B(m) for a block m (mth block) is defined as below.

$$B(m) = TB(m) \times \frac{A(m)}{TA(m)} \qquad (10)$$

Therefore, the allocated number of bits B(0) with respect to the initial block is obtained by the value relative to the size of TA(0), which is expressed in equation (11).

$$B(0) = TB(0) \times \frac{A(0)}{TA(0)} \qquad (11)$$

As described above, the allocated number of bits B(0) becomes the permitted-bit number of first block, and the B(m) becomes the bit number of mth block in an image. Accordingly, when the current number of bits of a coefficient quantized in quantizer 40 is smaller than the permitted-bit number B(m), the quantized coefficient is supplied to entropy coder 100 through a line L1. Meanwhile, when the current number of bits is larger than the permitted-bit number B(m), the bit number is repeatedly decreased prior to being sent to entropy coder 100, within the range which does not exceed the mean square error permitted in the class until reaching the allocated number of bits. In more detail, when the quantization coefficient is greater than the number of permitted bits B(m) allocated in the block bit number determinator 81, the MSE is calculated in the MSE calculator 82 according to the following equation, and a control signal is supplied to the coefficient eliminator 83 which erases the last coefficient among the DCT coefficient:

$$MSE = \frac{1}{4} \sum_{u=0}^{N-1} \sum_{v=0}^{N-1} |F(U, V) - C(U, V)|^2 \qquad (12)$$

where F(U,V) is the transformation coefficient after performing DCT, and C(U,V) is the quantized coefficient.

The MSE increases whenever non-zero coefficients are repeatedly eliminated, until the calculated amount of bits reaches the allocated amount. Therefore, using a specific MSE, which is given as a reference value different for each class, when the result of the calculation exceeds the MSE, the coefficient elimination process is finished, and the quantization coefficient is supplied to the entropy coder 100. When the MSE value exceeds the permitted value, even though the bit number of calculation is higher than the permitted-bit number, the coefficient elimination process is finished and the quantization coefficient is supplied to entropy coder 100 to avoid the severe distortion of the relevant block.

The entropy coder 100 codes the quantization coefficient within each block, and then transmits or stores the coded coefficient. At this time, as described in the above patent application Ser. No. 07/915,501 wherein the DC component is subjected to one-dimensional differential pulse coded modulation (DPCM), the predication error between the DC value of a preceding block and that of the current block is coded, and AC components are coded using a probability value obtained after considering the zero run and the number of succeeding non-zeros.

When the coding of one block is completed as stated above, the allocated total number of bits is adjusted and the coding process is repeated. That is, when the number of bits of the current block is B(m), the total number of bits is as follows.

$$TB(m+1) = TB(m) - B(m) \qquad (13)$$

The total activity TA(m+1) remaining at the next block is defined as:

$$TA(m+1) = TA(m) - A(m) \qquad (14)$$

where A(m) is the activity of the current block. The allocated number of bits of the next block is as below.

$$B(m+1) = TA(m+1) \times \frac{A(m+1)}{TA(m)} \qquad (15)$$

The decoding process is as follows. After reproducing real values in an entropy coder, these values are two-dimensionally arranged by inverse-zigzag scanning and processed by inverse discrete cosine transformation (IDCT), thereby restoring the original R, G, and B signals through color signal transformation.

In the present invention as described above, classes are sorted in accordance with the activities of an original image, quantization stepsize is controlled in accordance with the sorted classes, and the amount of bits (or number of bits) is constantly maintained per class. As a result, the quality of the image is stabilized.

What is claimed is:

1. An image compression method by setting fixed bit rates in an image compression system which performs transformation coding of an original image in predetermined block units, quantizes and entropy-codes the coded image, and stores or transmits a coded number of bits, said method comprising the steps of:
    activity detecting by detecting activities in accordance with visual characteristics of each of the predetermined block units;
    class sorting by classifying blocks into corresponding classes according to the activities detected in said activity detecting step;
    quantization controlling by setting quantization scale factors corresponding to the classes in accordance with an average activity of the activities, controlling the quantization by determining a quantization stepsize in accordance with predetermined values of a quantization table and the quantization scale factors, and quantizing coefficients by the quantization stepsize; and
    bit number adjusting by determining whether or not a bit number of the coefficients quantized in said quantization controlling step is suitable for an allocated number of bits per block with respect to the activities detected in said activity detecting step, and repeatedly adjusting the bit number of the quantized coefficients until the bit number is suitable for the allocated number of bits per block, thereby performing the entropy coding.

2. An image compression method by setting fixed bit rates as claimed in claim 1, wherein said bit number adjusting step comprises:
    a first step of supplying the quantized coefficients to an entropy coder when the quantized coefficients are equal to or less than the allocated number of bits which is used as a reference;
    a second step of calculating a mean square error of a corresponding block when the coefficients quantized in said first step are greater than the allocated number of bits;
    a third step of supplying the quantized coefficients to the entropy coder when the mean square error calculated in said second step is greater than the mean square error permitted in the corresponding block; and
    a fourth step of eliminating a last coefficient among the quantized coefficients when the mean square error calculated in said second step is less than said mean square error permitted in the corresponding block.

3. An image compression method by setting fixed bit rates as claimed in claim 2, wherein the allocated number of bits of said first step is detected by determining a relative ratio between a total sum of the activities detected in said activity detecting step and the activity of a predetermined block for obtaining the allocated number of bits.

4. An image compression method by setting fixed bit rates as claimed in claim 3, wherein the coefficient elimination of said fourth step is performed by making a non-zero coefficient at an end of a last part in a coefficient arrangement zero.

5. An image compression method by setting fixed bit rates as claimed in claim 1, wherein the average activity of said quantization controlling step of obtained by dividing a total sum of the activities detected in said activity detecting step by a total number of the predetermined block units.

6. An image compression method by setting fixed bit rates as claimed in claim 5, wherein the quantization is variably carried out for each of a plurality of transformation-coded coefficients obtained by transformation coding the predetermined block units of the original image.

7. An image compression method by setting fixed bit rates as claimed in claim 1, wherein said activity detecting step further comprises a step of detecting principal orientation components for each of the predetermined block units.

8. An image compression method by setting fixed bit rates as claimed in claim 7, wherein each of the principal orientational components is an orientational component whose activity is a minimum.

9. An image compression method by setting fixed bit rates as claimed in claim 7, wherein said class sorting step is carried out on the basis of a principal orientational component, and the activity and variance of a block.

10. An image compression system by setting fixed bit rates which performs transformation coding of an original image in predetermined block units, quantizes and entropy-codes the coded image, and stores or transmits a coded number of bits, said system comprising:
    an image activity detector/class sorter for detecting activities in accordance with a visual characteristic of each of the predetermined block units, and for classifying blocks into corresponding classes in accordance with the detected activities;
    a quantization control system for setting quantization scale factors corresponding to the classes in accordance with an average activity output from said image activity detector/class sorter, for controlling the quantization by multiplying predetermined values of a quantization table by the quantization scale factors, and for obtaining and outputting quantization coefficients; and
    a bit number adjusting portion for determining a pertinence of the quantization coefficients output from said quantization control system with an allocated number of bits per block from said activity detector/class sorter as a reference, and for repeatedly adjusting block bit number of the quantization coefficients until pertinence is determined, and outputting an adjusted block bit number to perform entropy coding.

11. An image compression system by setting fixed bit rates as claimed in claim 10, wherein said bit number adjusting portion comprises:
    a block bit number determinator for calculating the block bit number of the quantization coefficients, and for determining the pertinence of the block bit number of a current block by comparing an allocated number of bits with the block bit number calculated;

a mean square error calculating circuit for calculating a mean square error when the block bit number is larger than the allocated number of bits in said block bit number determinator; and a coefficient eliminator for erasing a last coefficient among the quantization coefficients when the mean square error calculated in said mean square error calculating circuit is smaller than the mean square error corresponding to the block.

* * * * *